(12) United States Patent
Thubert et al.

(10) Patent No.: US 12,445,407 B2
(45) Date of Patent: Oct. 14, 2025

(54) ANONYMIZING CLIENT-SIDE ADDRESSES

(71) Applicant: Cisco Technology, Inc., San Jose, CA (US)

(72) Inventors: Pascal Thubert, Roquefort les Pins (FR); Eric A Voit, Bethesda, MD (US); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/237,578

(22) Filed: Aug. 24, 2023

(65) Prior Publication Data

US 2025/0071083 A1    Feb. 27, 2025

(51) Int. Cl.
*G06F 15/16* (2006.01)
*H04L 9/40* (2022.01)
*H04L 61/2503* (2022.01)
*H04L 61/4511* (2022.01)

(52) U.S. Cl.
CPC ...... *H04L 61/2503* (2013.01); *H04L 61/4511* (2022.05); *H04L 63/0421* (2013.01)

(58) Field of Classification Search
CPC ............ H04L 61/2503; H04L 61/4511; H04L 63/0421
USPC .................................................. 709/245–246
See application file for complete search history.

(56) References Cited

U.S. PATENT DOCUMENTS

| | | | | |
|---|---|---|---|---|
| 8,504,722 B2 * | 8/2013 | Haddad | ............... | H04L 61/2514 709/224 |
| 10,212,261 B2 * | 2/2019 | Govindaraju | ........... | H04L 69/22 |
| 10,797,989 B2 * | 10/2020 | Tillotson | ............. | H04L 61/4511 |
| 2004/0233916 A1 * | 11/2004 | Takeuchi | .............. | H04L 61/251 370/466 |
| 2004/0246991 A1 * | 12/2004 | Tsuzuki | ................ | H04L 61/251 370/466 |
| 2008/0291885 A1 | 11/2008 | Miao et al. | | |
| 2009/0285215 A1 | 11/2009 | John et al. | | |

(Continued)

FOREIGN PATENT DOCUMENTS

WO    WO2023091574 A1    5/2023

OTHER PUBLICATIONS

Plonka, D., & Berger, A. Measured Approaches to IPV6 Address Anonymization and Identity Association.

(Continued)

*Primary Examiner* — Bharat Barot
(74) *Attorney, Agent, or Firm* — Lee & Hayes, P.C.

(57) ABSTRACT

Techniques for using Prefix Address Translation (PAT), Mobile Internet Protocol (MIP), and/or other techniques to anonymize server-side addresses in data communications. Rather than allowing a server and/or endpoint have visibility of a client IP address of a client device accessing the server and/or endpoint, a virtual network service instead returns a PAT IP address that is mapped to the client device and/or the endpoint device. In this way, IP addresses of clients devices are obfuscated by the virtual network. The client device may then communicate data packets to the server and/or endpoint using the PAT IP address as the source address, and the virtual network service that works in conjunction with the server and/or endpoints can convert the PAT IP address to the actual IP address of the client for return packets using PAT and forward the return packet onto the client device.

20 Claims, 7 Drawing Sheets

(56) References Cited

U.S. PATENT DOCUMENTS

| | | | |
|---|---|---|---|
| 2011/0208845 A1 | 8/2011 | Droms et al. | |
| 2013/0058256 A1* | 3/2013 | Li | H04L 61/2517 370/255 |
| 2015/0188881 A1* | 7/2015 | Bergman | H04L 61/5007 709/218 |
| 2016/0226815 A1* | 8/2016 | Wan | H04L 61/2521 |
| 2017/0134274 A1* | 5/2017 | Araújo | H04L 61/4511 |
| 2017/0289856 A1* | 10/2017 | Rune | H04L 61/2514 |
| 2017/0295503 A1* | 10/2017 | Govindaraju | H04L 69/22 |
| 2020/0305042 A1* | 9/2020 | Alam | H04L 45/121 |
| 2022/0021616 A1* | 1/2022 | K | H04L 61/2557 |
| 2023/0179579 A1 | 6/2023 | Maluf et al. | |

OTHER PUBLICATIONS

Search Report and Written Opinion for International Application No. PCT/US24/43728, Dated Oct. 30, 2024, 16 pages.

\* cited by examiner

ANONYMIZING CLIENT-SIDE ADDRESSES

TECHNICAL FIELD

The present disclosure relates generally to anonymizing addresses of client devices in traffic communicated to and from endpoint devices, such as servers.

BACKGROUND

Client devices often send information in data packets that is sensitive or private, and when the data packets are sent over public networks, the information in those packets can be viewed by potentially malicious entities. Accordingly, various types of encryption protocols (e.g., Hypertext Transfer Protocol Secure (HTTPS)) are used to communicate data packets over networks such that the payload of the data packets is encrypted to prevent entities from discerning sensitive information. However, the headers of the data packets are often unencrypted because information in the headers are often needed to make networking decisions. For instance, destination IP addresses are used to make routing decisions such that the data packets reach the correct destinations, source IP addresses can be used to make firewall decisions to drop or allow packets, and so forth. However, client devices may further desire that information in the headers is obfuscated as well from potentially malicious entities, such as the source address.

Various issues arise due to the visibility of the IP addresses shown in the source address field. For instance, once the address of the client device is known to a malicious entity, the address can be used for direct attacks on the client device. Additionally, malicious entities may be able to observe where the client devices are sending traffic, or which sites they are consulting. If the malicious entities are close to the client device, the malicious entities may be able to correlate the client device and server, thereby eliminating privacy of the client device. Thus, client devices communicating with servers, or other endpoints, are vulnerable to various attacks by malicious entities.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
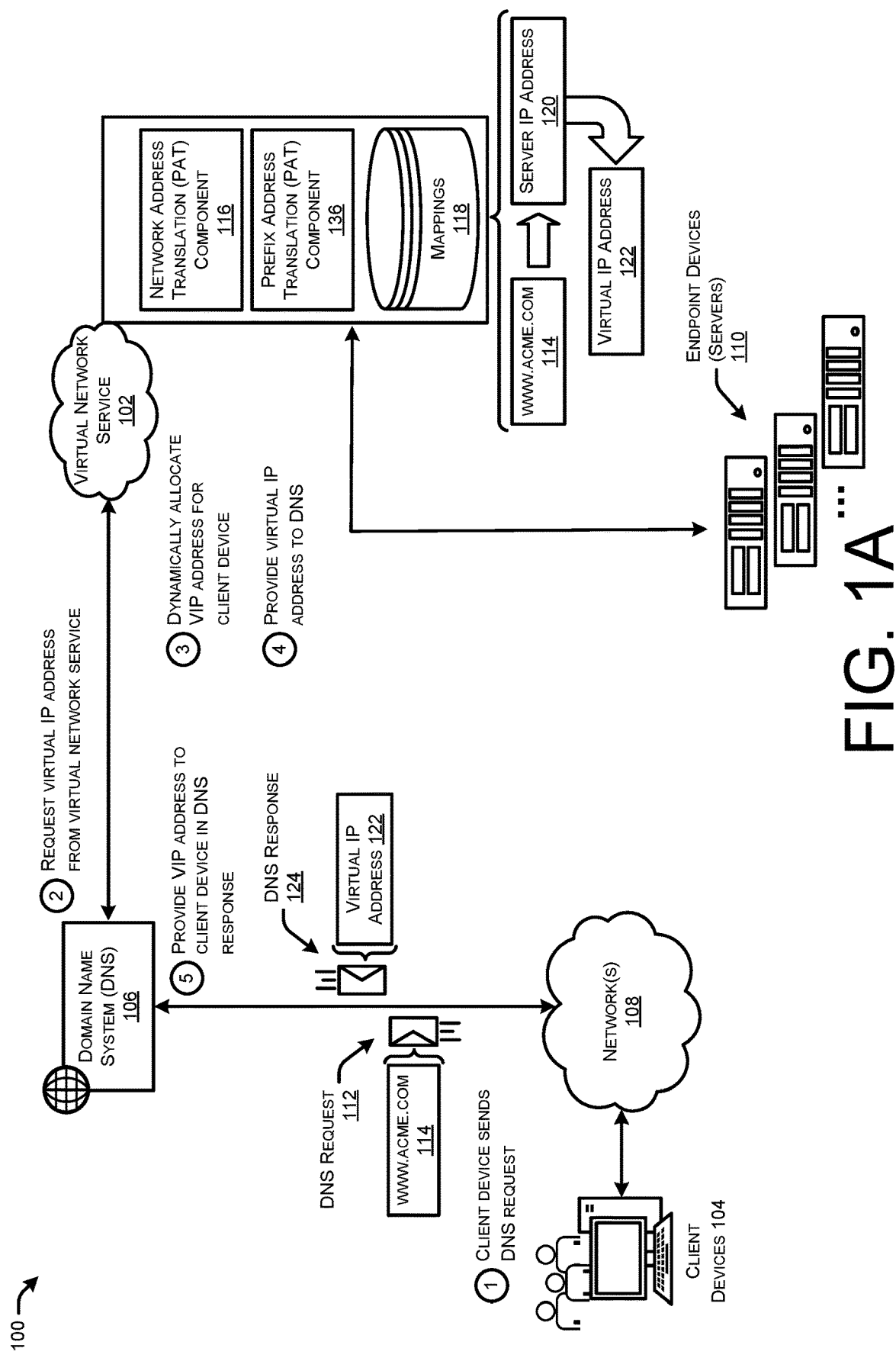
FIG. 1A illustrates a system-architecture diagram of a virtual network service that maps virtual IP (VIP) addresses to IP addresses of endpoints devices such that a DNS server can provide client devices with respective VIP addresses that are usable to reach the endpoint devices.

This disclosure describes techniques for using MIPv6, Prefix Address Translation (PAT), and/or other techniques to anonymize client-side addresses in data communications.

A first method to perform techniques described herein includes mapping an IP address of a client device to a PAT IP address, such as allocating as block of virtual IP (VIP) prefixes for the IP of the client device. The first method may further include determining that the client device requested an IP address of an endpoint. The first method may further include storing a first association between a client identifier (ID) of the client device and the PAT address. The first method may further include receiving a first packet having a destination address that is the IP address of the endpoint. The first method may further include performing Prefix Address Translation (PAT) by changing a source address of the first packet from the IP address of the client device to the PAT IP address and sending the first packet to a next hop associated with the IP address of the endpoint.

In some instances, the techniques described herein include a second method. The second method may include receiving a first packet having a destination address that is an IP address of an endpoint. The second method may further include performing Prefix Address Translation (PAT) by changing a source address of the first packet from an IP address of the client device to a PAT IP address. Further, the second method may include sending the packet to a next hop associated with the IP address of the endpoint. The second method may include receiving a second packet from the endpoint. The second method may include determining that a destination address of the second packet is the PAT IP address. The second method may include, determining that a destination address of the second packet is the PAT IP address. The second method may include sending the second packet to the client device.

Additionally, the techniques described herein may be performed by a system and/or device having non-transitory computer-readable media storing computer-executable instructions that, when executed by one or more processors, performs the method described above.

Example Embodiments

Generally, a packet sent by a client device may include an anonymous ID, but the prefix of the IP may be associated with the location of the client, and can be used to locate the client device and/or the client. A problem with triangular routing is that the packets sent from a server with an anonymized IP address is sourced at a place in the internet where that address is not topologically correct (because it is "located" where the anonymization service is, not where the anonymized servers are. With Transport Layer Security (TLS). HTTPS, and the like, that is some of the only information available to an observer on path that may do operations like slowing or blocking some destinations, or use the information against the client in whichever fashion. While techniques have been developed to protect some information of the client device, there are no techniques for protecting the location of the client device, which is only partially hidden from public view by complex cloud architectures and load balancers.

This disclosure describes techniques for using Prefix Address Translation (PAT) and/or other techniques (e.g., LISP, MIPv6, etc.) to anonymize client-side addresses in data communications. Rather than forwarding a data packet of the client device to an endpoint with its original source address, a virtual network service changes the prefix in the source address from the client with a prefix that his owned by the virtual service. In this way, IP addresses of client are obfuscated by the virtual network of PAT IP addresses. The client device may communicate data packets to the server and the virtual network service can translate received data packets having the IP address of the client device to PAT IP addresses and forward the data packet onto the server.

According to the techniques described herein, a virtual network service may provide PAT IP addresses on a client device-by-client device basis. That is, the virtual network service may associate a PAT IP address for each client IP address associated with a particular client device. As client devices send data packets to endpoint devices and/or request a DNS for the IP address of a particular server, the virtual network service and/or DNS may map a PAT IP address to the IP address of the client device, and store a mapping between each PAT IP address and the client device that received and/or was otherwise associated with the PAT IP address.

In some cases, the client device may attempt to send data packets to the particular server by placing the server IP address or a virtual IP address in the destination address field of the packets. However, the data packet may be steered to the virtual network service and the virtual network service may change the prefix of the IP and/or the port address of the IP in the source address to a prefix that is owned and/or is otherwise associated with the virtual network service. Once the data packet has been given a PAT IP address as its source, the virtual network service may forward data packet to the endpoint.

In some instances, the virtual network service may additionally ensure that traffic returning to the client device and from the servers is also protected. That is, the servers may be configured to utilize their IP addresses as source addresses in data packets and the PAT IP address of the client device as the destination address. In such examples, the virtual network service may convert the destination IP address of the return data packet from the PAT IP address to the client IP address such that the return data packet is forwarded to the client device. Generally, the virtual network service may map a respective PAT IP address to each client device such that the return traffic from the servers can be redirected back to the appropriate client device. So, when servers receive the traffic having source addresses that are PAT IP addresses generated by the virtual network service, the servers may respond with data packets that include the respective PAT IP address as a destination address. Once the virtual network service receives the packet, the virtual network service converts the destination address back to the client IP address. In this way, the virtual network service may also obfuscate client device IP addresses while ensuring that return traffic from the servers reach the correct client device.

In some cases, rather than having a DNS provide a client device with an IP address of an endpoint device, such as a server, the DNS instead returns a virtual IP (VIP) address that is mapped to the client device and the endpoint device. In this way, IP addresses of servers are obfuscated by a virtual network of VIP addresses. The client device may then communicate data packets to the server using the VIP address as the destination address, and a virtual network service that works in conjunction with DNS can convert the VIP address to the actual IP address of the server using NAT and forward the data packet onto the server.

A client device may send a DNS request to a DNS server for the DNS server to translate or resolve a domain name (e.g., website name, service name, etc.) to an IP address that is usable to contact the domain name. Traditionally, the DNS server would simply resolve the domain into the IP address (and/or other contact information) registered for the server and return the IP address to the client device. However, according to the techniques described herein, a virtual network service may work in conjunction (and/or be included in) the DNS service to provide VIP addresses on a client device-by-client device basis. That is, the virtual network service may associate a virtual network of IP addresses, or VIP addresses, for each IP address. As client devices request the DNS for the IP address of a particular server, the virtual network service and/or DNS may provide a different VIP address mapped to the IP address to each client device, and store a mapping between each VIP address and the client device that received the VIP address. Thus, client devices may request that DNS provide them with an IP address for a particular server, and each client device may be provided with a different VIP address that is mapped to the IP address by the virtual network service.

After receiving a VIP address, the client device may then attempt to send data packets to the particular server by placing the VIP address in the destination address field of the packets. However, the VIP address may result in the data packets being steered to the virtual network service. The virtual network service may then determine that the VIP address maps to the IP address of the particular server, and may further determine that the client device was in fact provided the VIP address, and the virtual network service may perform NAT on the data packets. That is, the virtual network service may translate the VIP address in the destination field of the packets to the IP address of the particular server and send the packets to the particular server. In this way, the destination address of servers may be represented by VIP address that are not actually the IP addresses of the servers, but can be translated using NAT techniques into the correct IP addresses for reaching the servers.

In addition to obfuscating the IP addresses of servers and endpoints to prevent attacks on the servers, the techniques may further allow the virtual network service to track source devices that may be attacking the servers. For instance, the virtual network service may note the source addresses that are using VIP addresses to attempt to reach the servers despite those source devices not being provided the VIP addresses by the virtual network service.

In some instances, the virtual network service may additionally ensure that traffic returning to the client device and from the servers is also protected. That is, the servers may be configured to utilize their IP addresses as source addresses in data packets. In such examples, the virtual network service may also convert the source IP address of the client devices into system VIP addresses that are virtual addresses that map back to the virtual network service. Generally, the virtual network service may map a respective system VIP address to each client device such that the return traffic from the servers can be redirected back to the appropriate client device. So, when servers receive the traffic having source addresses that are system VIP addresses for the virtual network service, the servers may respond with data packets that include the respective system VIP address as a destination address. Once the virtual network service receives the packet, the virtual network service translates the destination address from the system VIP address into the IP address of the appropriate client device. In this way, the virtual network service may also obfuscate client device IP addresses while ensuring that return traffic from the servers reach the correct client device.

In some instances, the virtual network service may additionally provide load balancing services to servers that are intended to received data packets. For example, the virtual network service may associate a number of servers with a singular endpoint (e.g., multiple servers supporting a website) and each server and/or group of servers may be associated with a VIP address. That is, in some cases, the virtual network service may store a single VIP address for an endpoint that has multiple respective servers that support the endpoint. In some examples, when the virtual network service receives a data packet from a client device, the virtual network service may determine which server to send the data packet to based on load balancing the endpoint system and to optimize performance of the endpoint system. Once the particular server is identified based on improving performance of the endpoint system, the virtual network service may determine the associated server and route the data packet such that the data packet will be sent to the identified server.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

At "1," a client device 104 may generate and send a DNS request 112 to the DNS 106. The DNS request 112 may include a request for the DNS 106 to translate a domain name (e.g., "www.acme.com") into an IP address that can be used for sending traffic to the desired website, service, etc., associated with the domain name.

The DNS 106 may receive the DNS request 112 and, at "2," request a VIP address from the virtual network service 102. The DNS 106 may also provide the virtual network service 102 with an indication of the domain name that the client device 104 would like translated into an IP address. In other examples, the DNS 106 may provide the actual IP address to the virtual network service 102 for the desired domain name.

Although illustrated as separate entities that communicate with each other, in some instances the DNS 106 and virtual network service 102 may be the same entity. That is, the DNS 106 may include the virtual network service 102, the virtual network service 102 may include the DNS 106, and so forth. The virtual network service 102 may be a cloud-based security service, a NAT service, and/or any type of platform or system.

The virtual network service 102 may receive the request for the VIP address for the domain name/IP address and at "3" dynamically allocate a VIP address for the client device. Generally, the virtual network service 102 may map or otherwise assign VIP addresses (e.g., virtual network) to IP addresses of endpoints 110. In some examples, the virtual network service 102 may allocate a prefix (e.g., /64 for IPV6, /24 for IPv4) in a geography to protect the addresses of the servers of the endpoint device 110 that it serves in that geography. In the case of IPv4, the stat is indexed by the pair client address+virtual address, so the same virtual address can be used for multiple clients to denote different real servers of the endpoint device 110 in some instances. As illustrated, the virtual network service 102 may map the domain name 114 to the service IP address 120 for the service or website, and may then map that server IP address 120 to the virtual IP address 122.

At "4," the virtual network service 102 may provide the VIP address to the DNS and/or directly to the client device 104. The VIP address 122 may be provided to the client device 104 in a DNS response 124 such that the client device 104 determines that the VIP address is usable to contact the desired endpoint device 110. Although illustrated as servers, the endpoint devices 110 can generally be any device that a client device 104 would like to contact, including user devices (e.g., laptops, phones, wearable devices, etc.), network devices (e.g., routers, switches, hubs, etc.), and/or any other type of devices that can be contacted over networks 108.

Figure 1B:
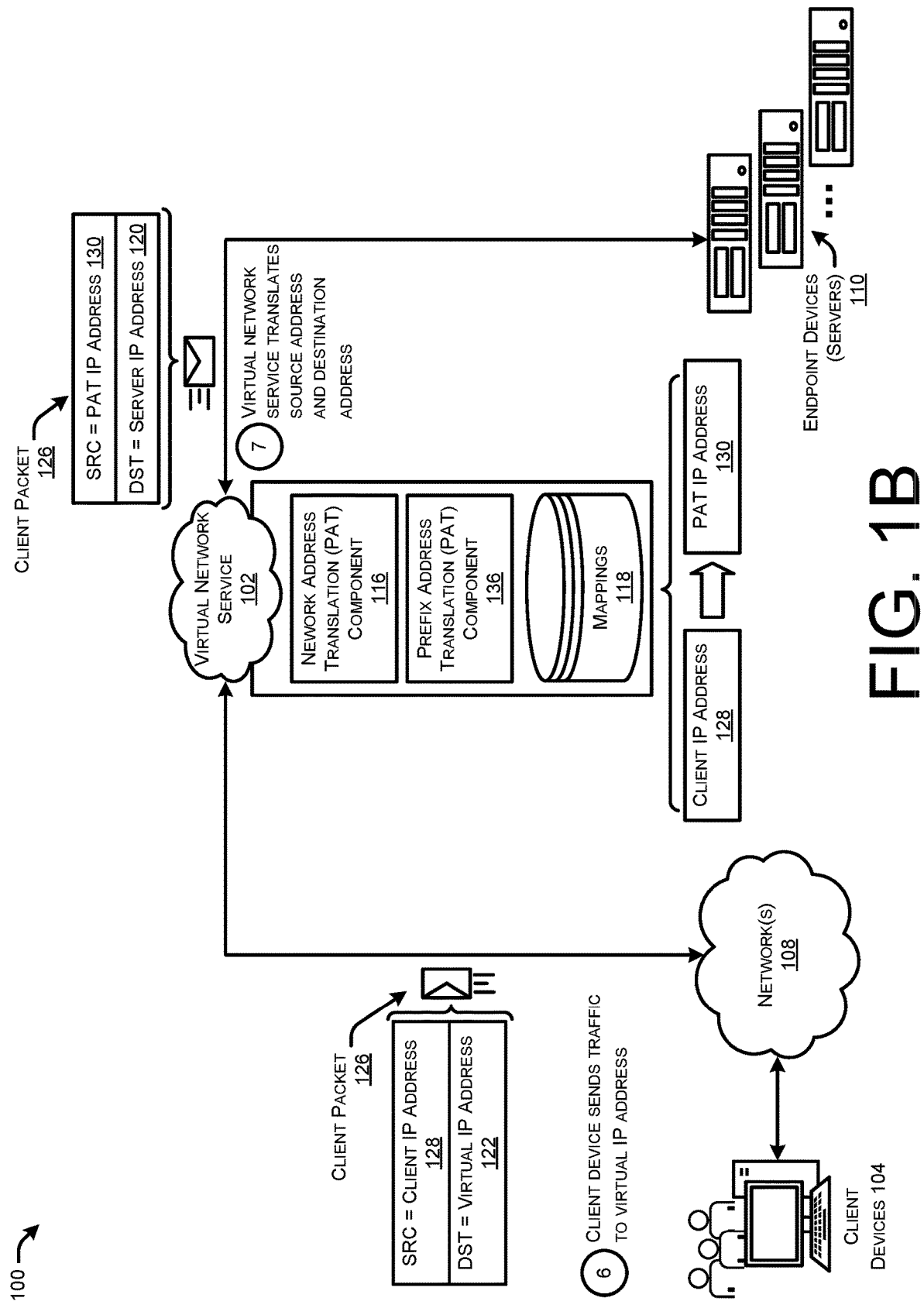
FIG. 1B illustrates a system-architecture diagram of a virtual network service that performs Prefix Address Translation (PAT) to convert a source address of packets sent from a client device from a client IP address to a PAT IP address.
Figure 1C:
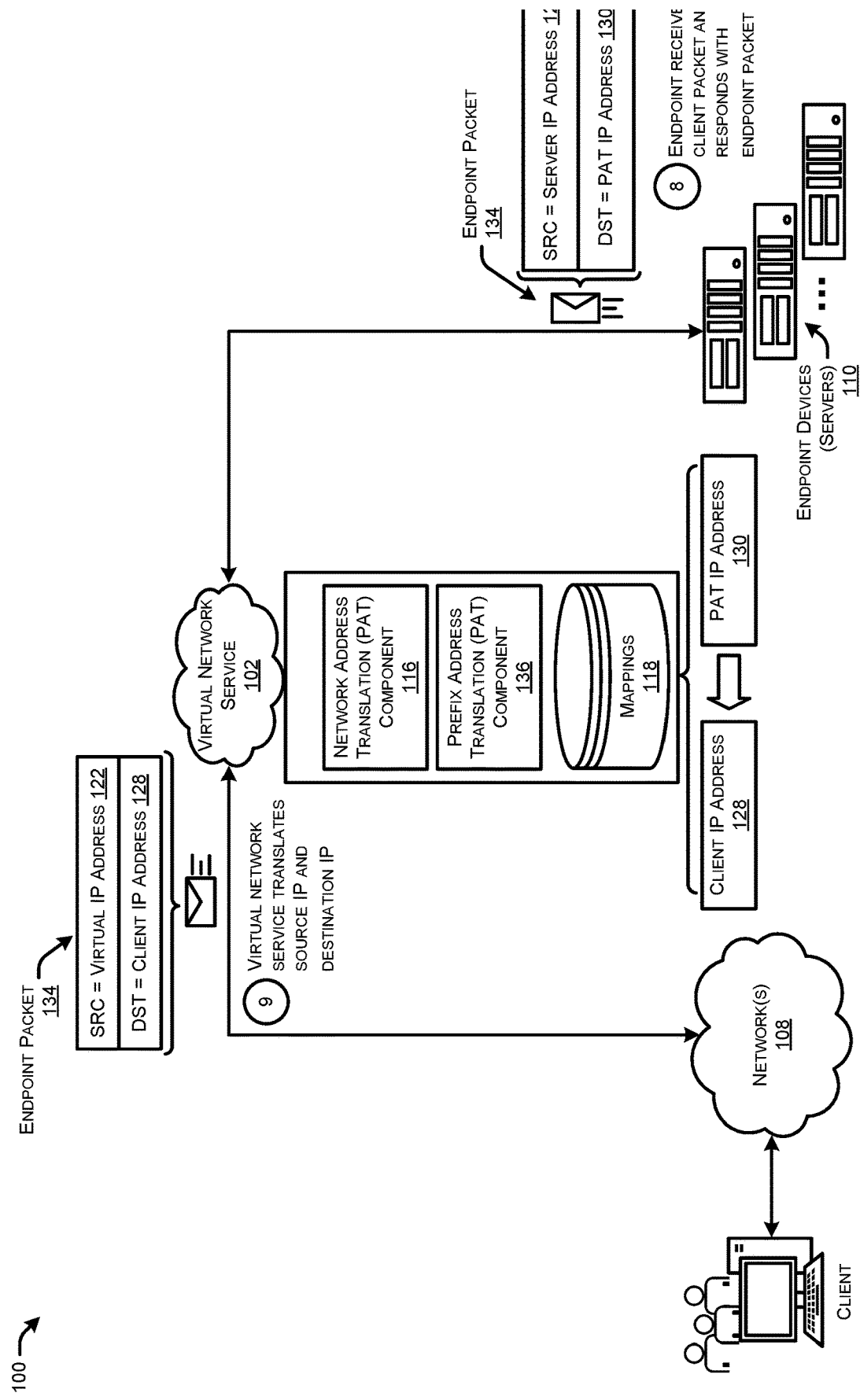
FIG. 1C illustrates a system-architecture diagram of a virtual network service that performs Prefix Address Translation (PAT) to convert a destination address of packets sent from an endpoint from a PAT IP address to a client IP address.

FIGS. 1B and 1C illustrate a system-architecture diagram 100 of a virtual network service 102 that performs Network Address Translation (NAT) to convert a destination address of packets sent from a client device 104 from a VIP address to an IP address of the endpoint device 110 and performs Prefix Address Translation (PAT) to convert a source address of packets sent from the client device 104 from a client IP address to a PAT IP address.

At "6," the client device 104 may send traffic including a client packet 126 to the VIP address 122 that was provided in the DNS response 124. The client packet 126 may include the VIP address 122 corresponding to the desired endpoint device 110 as the destination address, and may further include the client IP address 128 of the client device 104 as the source address. Generally, the VIP address 122 may cause the client packet 126 to be communicated to the virtual network service 102 by devices in the network(s) 108.

At "7," the virtual network service 102 may translate the source address and the destination address of the client packet 126 using PAT and/or NAT techniques. For instance, a NAT component 116 and/or the PAT component 136 may utilize mappings 118 to determine how to translate or convert the addresses. Specifically, the NAT component 116 and/or the PAT component 136 may translate the VIP address 122 to the actual service IP address 120 of the server/endpoint device 110 and place the server IP address 120 in the destination address of the client packet 126. A PAT component 136 may utilize mappings 118 to determine how to translate or convert the addresses. Specifically, the PAT component 136 may translate the client IP address 128 to a PAT IP address 130 and place the PAT IP address 130 in the source address of the client packet 126. The virtual network service 102 may store a mapping 118 between the client device 104 and the PAT IP address 130. In some instances, client devices 104 may have respective PAT IP addresses 130 such that the virtual network service 102 can cause return traffic from the endpoint devices 110 flow back through the virtual network service 102. Thus, the PAT component 136 may translate the source address of the client packet 126 to a PAT IP address 130 that corresponds to the virtual network service 102, and is mapped in the mappings 118 to a client ID of the client device 104 (e.g., the client IP address 128 in some instances). In some cases, the PAT IP address may include a translation of the prefix of the IP of the client device and/or the PAT IP address may include a translation of the port address of the IP of the client device.

The client packet 126 is then communicated to the endpoint device 110 corresponding to the server IP address 120 (and the corresponding VIP address 122) indicated in the client packet 126. The endpoint device 110 may, in some examples, determine to respond to the client device 104. The endpoint device 110 may use the source address of the client packet 126 (e.g., the PAT IP address 130) as the destination address in the endpoint packet 134, and the server IP address 132 as the source address. Thus, the endpoint device 110 may send one or more endpoint packets 134 with the PAT IP address 130 as the destination address such that the endpoint packet 134 is sent to the virtual network service 102 at "8."

The NAT component 116 may and/or the PAT component 136, at "9," translate the destination IP address in the endpoint packet 134 and the PAT component 136 may translate the source IP address in the endpoint packet 134. The NAT component 116 and the PAT component 136 may use the mappings 118 to translate the PAT IP address 130 in the destination address field to the client IP address 128 of the client device 104 such that the endpoint packet 134 is sent to the client device 104. Further, the NAT component 116 and/or the PAT component 136 may use the mappings 118 to translate the server IP address 120 in the source address field to the virtual IP address 122 that is allocated by the virtual network service 102. In this way, any return traffic from the client device 104 may be sent to the VIP address 122 that is the source address of the endpoint packet 134. The endpoint packet 134 may then be sent to the client device 104.

In the example of FIGS. 1A-1C, the techniques may be performed according to home agent techniques of Mobile IPV6 defined by Request for Comments (RFC) 6275. The DNS 106 may use a new interface with a Home Address (HA) function where the interface enables the DNS server 106 to query the HA function for a virtual address upon a DNS request. The novel query contains the client address and the server address that it would have returned by the DNS server without the invention. For the client devices, the HA function returns an address from the /64 in the virtual interface. The end result is that the set of clients of the virtual network service 102 appear to be located in the same flat subnet, with the effect being to hide the topology and the server addresses altogether.

Using that interface, when a new DNS request 124 is made (either by new client 104 or for a different server from a known client 104), one virtual address (serving as home address in mobility management) in the /64 is allocated dynamically by the HA, returned to the DNS server 106 and that is the address returned to the client in the DNS response 124. When the same client does the same request again, it is usually preferable to return the same address as the first time to keep the sessions going. To that effect, the techniques described herein include load-balancing the DNS 106 to HA interface based on the client address, or a hash of the client address and the DNS name. This way, the same request is served by the same HA server which can return the virtual IP address from an existing state if one is found.

A home agent function (from MIPv6 RFC 6275 or similar mobility protocol) may be associated to the virtual network service 102. That home agent function may tunnel the packet for the virtual address assigned to the server to the real address of the server (used as Care-Of Address in the packet). MIPv6 may use a normal tunnel and alternates like SRH insertion and NAT or PAT are possible. In the case of NAT, the home agent also NATs the source address to another address it owns, so as to be on path of the traffic back.

In the case of MIPv6, the server of the endpoint device 110 may use Home Address options to communicate to the home agent with respect to the particular client device 104. In-band (in the tunnel as an implicit function) or out of band, the home agent may instruct the server of the endpoint device 110 to support the home address, e.g., add it to a loop back or just store it in the socket information. When it responds, the server of the endpoint device 110 may respond with that virtual HA IP address. If ingress filtering—BCP 38, RFC 2827—is enforced, the server needs to tunnel back to the home agent, using its real address as source. This enables the server of the endpoint device 110 to perform its real process but based on the virtual IP, so any application state and crypto that relies on that address continues to work. When that is not needed it is also possible for the stack to absorb the addresses and only present the real server and client addresses to the upper layers, in a fashion similar (though stateless in this case) of host identity protocol (HIP). In the case of IPv4, a NAT function in the cloud service may provide the same result, which can be achieved without tunneling. The home agent may be located in the virtual network service 102. Packets to and from the home agent and the server may be tunneled using the Home Address option from the server to the home agent, in which case the source is the server and the destination is the home agent with no encapsulation. To hide the IP address of the server (the Care-of Address in MIPv6 terms), the server of the endpoint device 110 can answer to the client device 104 using the home address (e.g., virtual IP address 122) as source and the PAT IP address 130 as destination.

Figure 2:
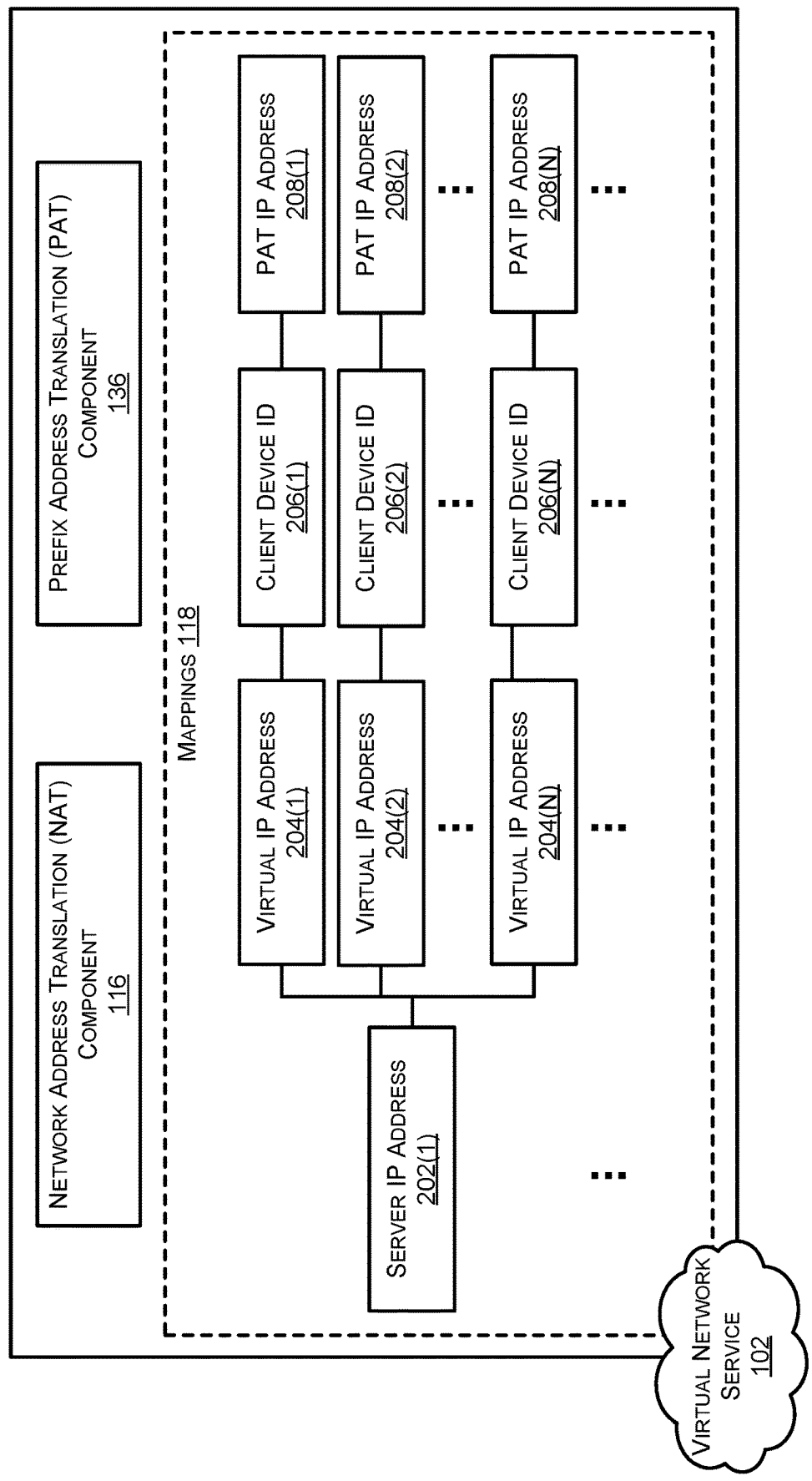
FIG. 2 illustrates example mappings between an IP address of a server, VIP addresses mapped to the IP address, client device identifiers (IDs) mapped to respective VIP addresses, and PAT IP addresses used for respective client devices.

FIG. 2 illustrates example mappings 118 between an IP address of a server, VIP addresses mapped to the IP address, client device identifiers (IDs) mapped to respective VIP addresses, and PAT IP addresses used for respective client devices. As illustrated, the NAT component 116 and/or the PAT component 136 may store mappings, which may generally be any type of association in memory. Although not illustrated, at least some of the mapping 118 information may be stored at the DNS 106, and/or the DNS 106 may be included in the virtual network service 102.

The NAT component 116 and/or the PAT component 136 may initially store indications of service IP addresses 202(1)-202(N) (not illustrated). Generally, each endpoint device 110, or server, has at least one actual server IP address 202. Each server IP address 202 may then be mapped to, or allocated, a virtual network of VIP addresses 204(1)-204(N) where "N" is based on the number of client devices 104 that have requested the IP address for the particular server of the endpoint device 110.

Each time the NAT component 116 and/or the PAT component 136 allocates and provides a client device 104 with a VIP address 204, the NAT component 116 and/or the PAT component 136 may store an association or mapping 118 between the VIP address 204 and a client device ID 206 for that client device 104 (e.g., client IP address in some examples). Thus, each VIP address 204 is associated with a respective client device ID 206. In some instances, the NAT component 116 and/or the PAT component 136 may further map each client device ID 206 with a respective PAT IP address 208 that is used for obfuscating the identify of the client device 104 as well as ensuring that return traffic from the servers of the endpoint device 110 is sent back to the virtual network service 102. By having a PAT IP address 208 mapped to each client device ID 206, when the virtual network service 102 receives traffic back from the endpoint devices 110 that has the destination address as a particular PAT IP address 208, the NAT component 116 and/or the PAT component 136 may use the mappings 118 to translate the PAT IP address 208 back to a client IP address of the client device 104 and send the packet to the correct client device 104 using the current client IP address.

It should be understood that the mappings 118 are merely illustrative, and other types of mappings 118 or data structures can be used for the LISP techniques described herein.

Figure 3A:
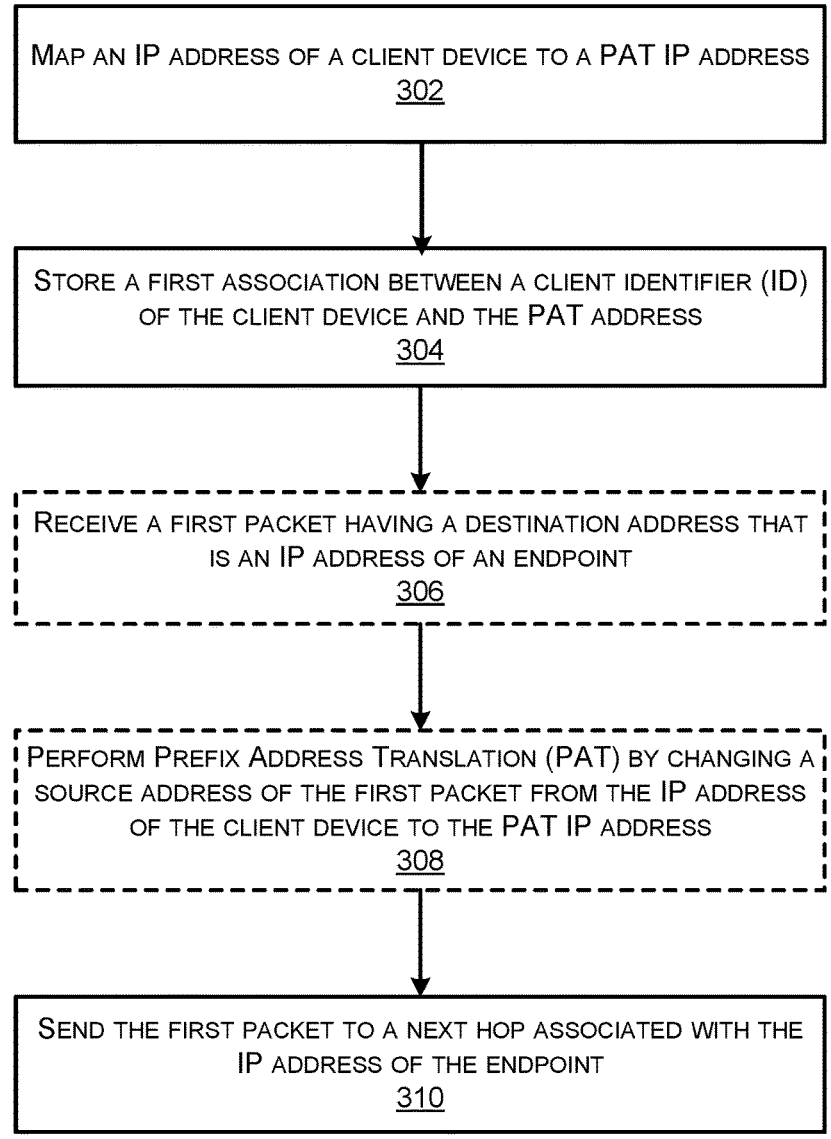
FIGS. 3A and 3B collectively illustrate a flow diagram of an example method for using Prefix Address Translation (PAT) in conjunction with DNS to anonymize server-side addresses in data communications.
Figure 3B:
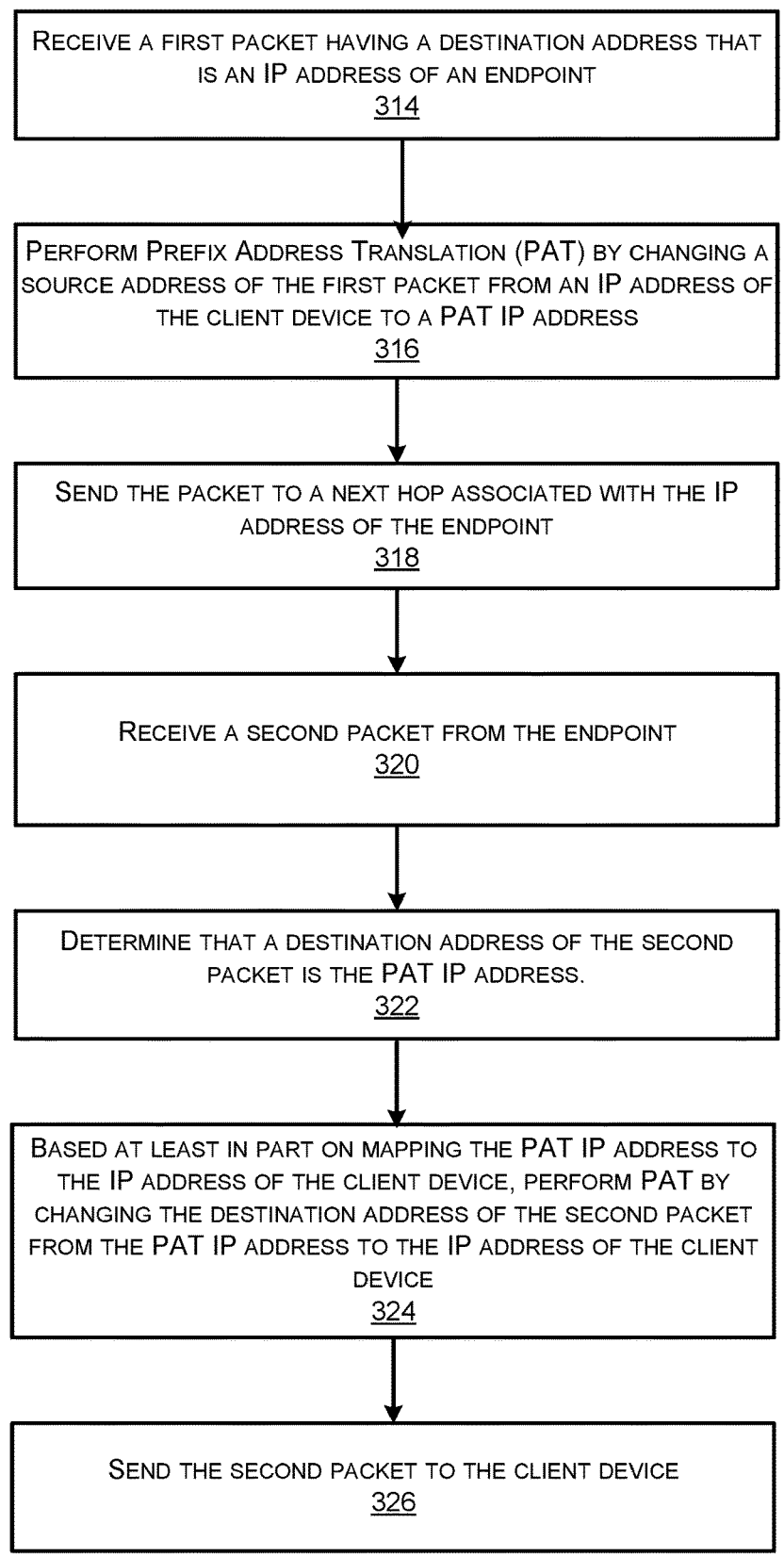

FIGS. 3A and 3B illustrate flow diagrams of an example methods that illustrates aspects of the functions performed at least partly by the devices as described in FIGS. 1A, 1B, 1C, and 2. The logical operations described herein with respect to FIGS. 3A and 3B may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3A and 3B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components.

FIG. 3A illustrates a flow diagram of an example method 300 for using Network Address Translation (NAT) in conjunction with DNS and Prefix Address Translation (PAT) to anonymize client-side addresses in data communications.

In some examples, the steps of method 300 may be performed, at least partly, by a virtual network service 102, which may include, be included in, or at least be associated with a DNS 106 (e.g., communicatively coupled). The virtual network service 102 may comprise one or more processors and one or more non-transitory computer-readable media storing computer-executable instructions that, when executed by the one or more processors, cause the one or more processors to perform the operations of method 300.

At 302, the virtual network service 102 may map an IP address of a client device to a PAT IP address. For instance, the PAT component 136 may allocate a PAT IP address for an IP address of a client device 104.

At 304, the virtual network service 102 may store a first association between a client identifier (ID) of the client device and the PAT address. For instance, the PAT component 136 may utilize mappings 118 to store associations between client IDs and PAT IP addresses.

At 306, the virtual network service 102 may receive a first packet having a destination address that is an IP address of an endpoint. For example, the client device 104 may send a client packet 126 to the endpoint 110 that is routed through the virtual network service 102.

At 308, the virtual network service 102 may perform Prefix Address Translation (PAT) by changing a source address of the first packet from the IP address of the client device to the PAT IP address. For example, the virtual network service 102 may install a PAT at the HA for the client IP address. This PAT changes the prefix in the source address from the client, with a prefix that is owned by the Home Agent. This may be the same as or different from the prefix used at the Home Network for the Home Addresses of the virtual network service.

It should be noted that steps 306 and 308 may be performed by the virtual network service 102 that includes a DNS 106, or may be performed independent of the virtual network service 102 and by an independent DNS 106.

At 310, the virtual network service 102 may send the first packet to a next hop associated with the IP address of the endpoint. For instance, the virtual network service 102 may send the client packet 126 to the endpoint device 110.

FIG. 3B illustrates a flow diagram of an example method 312 for using Network Address Translation (NAT) in conjunction with DNS and Prefix Address Translation (PAT) to anonymize client-side addresses in data communications.

In some examples, the steps of method 312 may be performed, at least partly, by a virtual network service 102, which may include, be included in, or at least be associated with a DNS 106 (e.g., communicatively coupled). The virtual network service 102 may comprise one or more processors and one or more non-transitory computer-readable media storing computer-executable instructions that, when executed by the one or more processors, cause the one or more processors to perform the operations of method 312.

At 314, the virtual network service 102 may receive a first packet having a destination address that is an IP address of an endpoint. For example, the client device 104 may send a client packet 126 to the endpoint 110 that is routed through the virtual network service 102.

At 316, the virtual network service 102 may perform Prefix Address Translation (PAT) by changing a source address of the first packet from an IP address of the client device to a PAT IP address. For example, the virtual network service 102 may install a PAT at the HA for the client IP address. This PAT changes the prefix in the source address from the client, with a prefix that is owned by the Home Agent. This may be the same as or different from the prefix used at the Home Network for the Home Addresses of the virtual network service.

At 318, the virtual network service 102 may send the packet to a next hop associated with the IP address of the endpoint. For instance, the virtual network service 102 may send the client packet 126 to the endpoint device 110.

At 320, the virtual network service 102 may receive a second packet from the endpoint. For example, the virtual network service 102 may receive an endpoint packet 134 from the endpoint devices 110 with a source address indicating the server IP address 120 and the destination address including the PAT IP address 130.

At 322, the virtual network service 102 may determine that a destination address of the second packet is the PAT IP address. For instance, the virtual network service 102 may access the mappings 118 to determine that the PAT IP address included in the source address is associated with the client devices 104.

At 324, the virtual network service 102, may, based at least in part on mapping the PAT IP address to the IP address of the client device, perform PAT by changing the destination address of the second packet from the PAT IP address to the IP address of the client device. For instance, the virtual network service 102 may access the mappings 118 to determine which client IP address corresponds to the PAT IP address listed in the destination address of the endpoint packet 134.

At 326, the virtual network service 102 may send the second packet to the client device. For instance, the virtual network service 102 may send the endpoint packet 134 to the client device 104.

Figure 4:
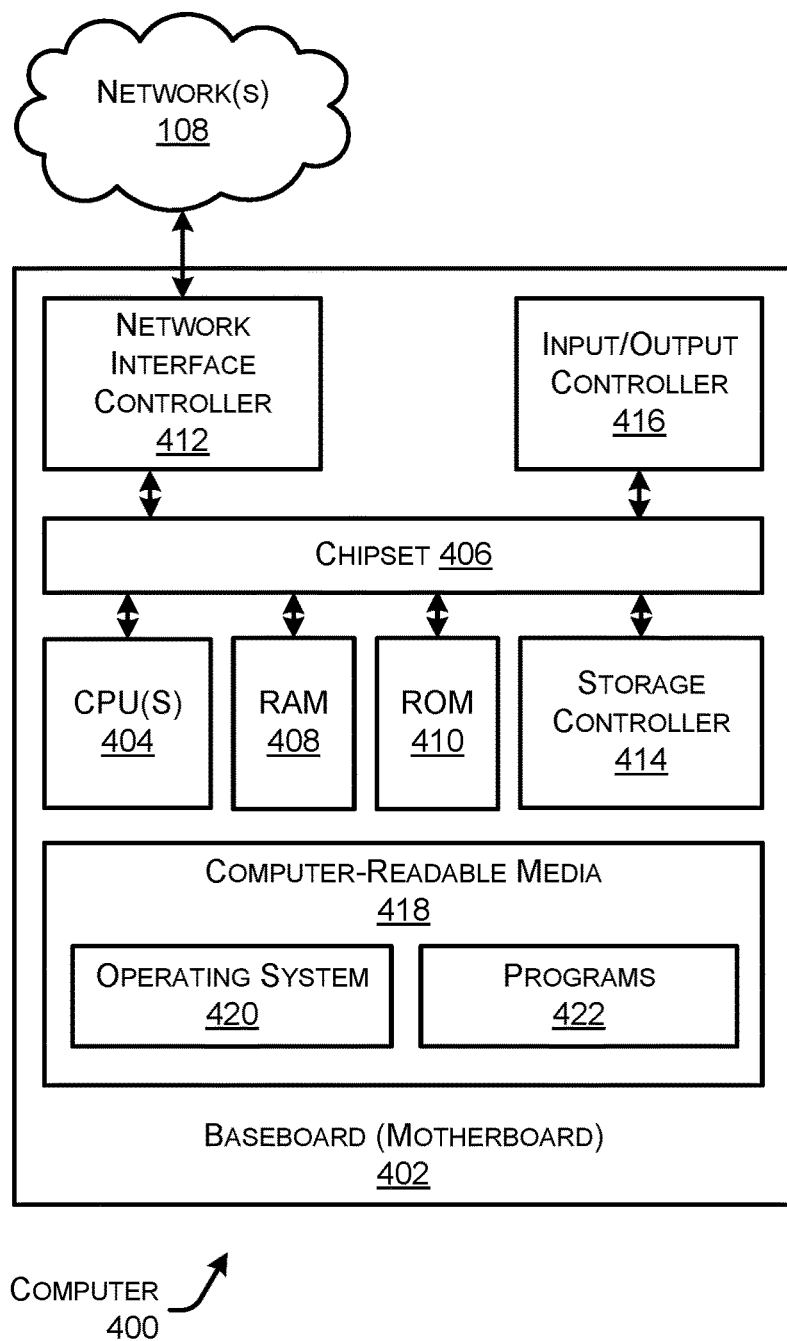
FIG. 4 is a computer architecture diagram showing an illustrative computer hardware architecture for implementing a computing device that can be utilized to implement aspects of the various technologies presented herein.

FIG. 4 shows an example computer architecture for a computer 400 capable of executing program components for implementing the functionality described above. The computer architecture shown in FIG. 4 illustrates a conventional server computer, workstation, desktop computer, laptop, tablet, network appliance, e-reader, smartphone, or other computing device, and can be utilized to execute any of the software components presented herein. The computer 400 may, in some examples, correspond to a device and/or a system of devices that support the virtual network service 102, the DNS 106, and/or a combination thereof, described herein, and may comprise networked devices such as servers, switches, routers, hubs, bridges, gateways, modems, repeaters, access points, etc. That is, the computer 400, or a system of computers 400, may be configured to perform some or all of the techniques performed by the virtual network service 102, some or all of the techniques performed by the DNS 106, and/or any combination thereof.

The computer 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computer 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computer 400. The chipset 406 can further provide an interface to a computer-readable storage medium such as a read-only memory ("ROM") 410 or non-volatile RAM ("NVRAM") for storing basic routines that help to startup the computer 400 and to transfer information between the various components and devices. The ROM 410 or NVRAM can also store other software components necessary for the operation of the computer 400 in accordance with the configurations described herein.

The computer 400 can operate in a networked environment using logical connections to remote computing devices and computer systems through a network, such as the network 108. The chipset 406 can include functionality for providing network connectivity through a NIC 412, such as a gigabit Ethernet adapter. The NIC 412 is capable of connecting the computer 400 to other computing devices over the network 108. It should be appreciated that multiple NICs 412 can be present in the computer 400, connecting the computer to other types of networks and remote computer systems.

The computer 400 can be connected to a storage device 418 that provides non-volatile storage for the computer. The storage device 418 can store an operating system 420, programs 422, and data, which have been described in greater detail herein. The storage device 418 can be connected to the computer 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computer 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 400 can further read information from the storage device 418 by detecting the physical states or characteristics of one or more particular locations within the physical storage units.

In addition to the mass storage device 418 described above, the computer 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 400. In some examples, the operations performed by devices in the virtual network service 102, and or any components included therein, may be supported by one or more devices similar to computer 400. Stated otherwise, some or all of the operations performed by the virtual network service 102, and or any components included therein, may be performed by one or more computer devices 400 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computer 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 418 can store other system or application programs and data utilized by the computer 400.

In one embodiment, the storage device 418 or other computer-readable storage media is encoded with computer-executable instructions which, when loaded into the computer 400, transform the computer from a general-purpose computing system into a special-purpose computer capable of implementing the embodiments described herein. These computer-executable instructions transform the computer 400 by specifying how the CPUs 404 transition between states, as described above. According to one embodiment, the computer 400 has access to computer-readable storage media storing computer-executable instructions which, when executed by the computer 400, perform the various processes described above with regard to FIGS. 1-3B. The computer 400 can also include computer-readable storage media having instructions stored thereupon for performing any of the other computer-implemented operations described herein.

The computer 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computer 400 might not include all of the components shown in FIG. 4, can include other components that are not explicitly shown in FIG. 4, or might utilize an architecture completely different than that shown in FIG. 4.

The computer 400 may include one or more hardware processors 404 (processors) configured to execute one or more stored instructions. The processor(s) 404 may comprise one or more cores. Further, the computer 400 may include one or more network interfaces configured to provide communications between the computer 400 and other devices, such as the communications described herein as being performed by the virtual network service 102. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 422 may comprise any type of programs or processes to perform the techniques described in this disclosure for providing a virtual network service 102 that is capable of anonymizing service-side addresses. That is, the computer 400 may comprise any one of the devices that support the virtual network service 102. The programs 422 may comprise any type of program that cause the computer 400 to perform techniques for communicating with other devices using any type of protocol or standard, and performing NAT, PAT, and/or DNS, to anonymize client-side addresses.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system that runs a virtual service that anonymizes Internet Protocol (IP) addresses of client devices using a prefix address translation (PAT) service, the system comprising:
   one or more processors; and
   one or more non-transitory computer-readable media storing computer-executable instructions that, when executed by the one or more processors, cause the one or more processors to perform operations comprising:
   generating a PAT Virtual IP (VIP) address based at least in part on an IP address of a client device;
   mapping the IP address of the client device to the PAT VIP address;
   storing a first association between a client identifier (ID) of the client device and the PAT IP address;
   receiving a first packet having a destination address that is an IP address of an endpoint;
   determining that a destination address of the first packet is a VIP address associated with the endpoint;
   determining that a source device is the client device to which the VIP address associated with the endpoint was provided;
   performing Prefix Address Translation (PAT) by changing a source address of the first packet from the IP address of the client device to the PAT VIP address;
   sending the first packet to a next hop associated with the IP address of the endpoint in response to determining that the source device is the client device to which the VIP address associated with the endpoint was provided;
   receiving a second packet from the endpoint;
   determining that a destination address of the second packet is the PAT VIP address;
   based at least in part on the mapping of the PAT VIP address to the IP address of the client device, performing PAT by changing the destination address of the second packet from the PAT VIP address to the IP address of the client device; and
   sending the second packet to the client device.

2. The system of claim 1, the operations further comprising:
   mapping another IP address of another client device to another PAT IP address;

determining the other client device requested another IP address of another endpoint; and storing a second association between another client identifier (ID) of the other client device and the other PAT IP address.

3. The system of claim 1, the operations further comprising:

mapping at least one server IP address of the endpoint to the VIP address associated with the endpoint;

receiving a domain name system (DNS) request to resolve a domain name on behalf of the client device;

converting the domain name into the VIP address associated with the endpoint; and providing the VIP address associated with the endpoint for use by the client device to contact the endpoint.

4. The system of claim 3, the operations further comprising:

determining that a destination address of a second packet is the VIP address associated with the endpoint;

determining that the source device is not the client device to which the VIP address associated with the endpoint was provided; and dropping the second packet.

5. The system of claim 3, the operations further comprising:

determining that a destination address of a second packet is the VIP address associated with the endpoint;

determining that the source device is the client device to which the VIP address associated with the endpoint was provided; and forwarding the second packet to the next hop associated with the endpoint.

6. The system of claim 1, wherein the system includes a Network Address Translation (NAT) service and the PAT service.

7. The system of claim 1, wherein the system includes a Domain Name System (DNS) service and the PAT service.

8. The system of claim 1, wherein both the PAT VIP address and the IP address of the client device comprises an IPV6 address.

9. The system of claim 1, wherein both the PAT VIP address and the IP address of the client device comprises an IPV4 address.

10. The system of claim 1, wherein the IP address of the client device comprises a first portion including a prefix and a second portion including bits, the performing the PAT including translating the prefix in the first portion and maintaining the bits in the second portion.

11. A method performed at least partly by a computing system that anonymizes Internet Protocol (IP) addresses of client devices using prefix address translation (PAT) IP addresses, the method comprising:

generating a PAT Virtual IP (VIP) address based at least in part on an IP address of a client device;

mapping the IP address of the client device to the PAT VIP address;

storing a first association between a client identifier (ID) of the client device and the PAT VIP address;

receiving a first packet having a destination address that is an IP address of an endpoint;

determining that a destination address of the first packet is a VIP address associated with the endpoint;

determining that a source device is the client device to which the VIP address associated with the endpoint was provided;

performing PAT by changing a source address of the first packet from the IP address of the client device to the PAT VIP address;

sending the first packet to a next hop associated with the IP address of the endpoint in response to determining that the source device is the client device to which the VIP address associated with the endpoint was provided;

receiving a second packet from the endpoint;

determining that a destination address of the second packet is the PAT VIP address;

based at least in part on the mapping of the PAT VIP address to the IP address of the client device, performing PAT by changing the destination address of the second packet from the PAT VIP address to the IP address of the client device; and sending the second packet to the client device.

12. The method of claim 11, further comprising:

mapping another IP address of another client device to another PAT IP address;

determining the other client device requested another IP address of another endpoint; and storing a second association between another client identifier (ID) of the other client device and the other PAT IP address.

13. The method of claim 11, further comprising:

mapping at least one server IP address of the endpoint to the VIP address associated with the endpoint;

receiving a domain name system (DNS) request to resolve a domain name on behalf of the client device;

converting the domain name into the VIP address associated with the endpoint; and providing the VIP address associated with the endpoint for use by the client device to contact the endpoint.

14. The method of claim 13, further comprising:

determining that a destination address of a second packet is the VIP address associated with the endpoint;

determining that the source device is not the client device to which the VIP address associated with the endpoint was provided; and dropping the second packet.

15. The method of claim 13, further comprising:

determining that a destination address of a second packet is the VIP address associated with the endpoint;

determining that the source device is the client device to which the VIP address associated with the endpoint was provided; and forwarding the second packet to the next hop associated with the endpoint.

16. The method of claim 11, wherein the system includes a Network Address Translation (NAT) service and a PAT service.

17. The method of claim 11, wherein the system includes a Domain Name System (DNS) service and a PAT service.

18. One or more non-transitory computer-readable media storing computer executable instructions that, when executed by one or more processors, cause the one or more processors to perform operations comprising:

receiving a first packet having a destination address that is an IP address of an endpoint;

determining that a destination address of the first packet is a VIP address associated with the endpoint;

determining that a source device is the client device to which the VIP address associated with the endpoint was provided;

performing Prefix Address Translation (PAT) by changing a source address of the first packet from an IP address of a client device to a PAT VIP address;

sending the first packet to a next hop associated with the IP address of the endpoint in response to determining that the source device is the client device to which the VIP address associated with the endpoint was provided;

receiving a second packet from the endpoint;

determining that a destination address of the second packet is the PAT VIP address;

based at least in part on mapping the PAT VIP address to the IP address of the client device, performing PAT by changing the destination address of the second packet from the PAT VIP address to the IP address of the client device; and sending the second packet to the client device.

19. The one or more non-transitory computer-readable media of claim 18, the operations further comprising:

mapping at least one server IP address of the endpoint to the VIP address associated with the endpoint;

receiving a domain name system (DNS) request to resolve a domain name on behalf of the client device;

converting the domain name into the VIP address associated with the endpoint; and providing the VIP address associated with the endpoint for use by the client device to contact the endpoint.

20. The one or more non-transitory computer-readable media of claim 19, the operations further comprising:

determining that a destination address of a second packet is the VIP address associated with the endpoint;

determining that the source device is not the client device to which the VIP address associated with the endpoint was provided; and dropping the second packet.

* * * * *